A. DAVIDSON.
CORN HARVESTER.
APPLICATION FILED NOV. 20, 1914.
1,179,290.
Patented Apr. 11, 1916.
2 SHEETS—SHEET 1.
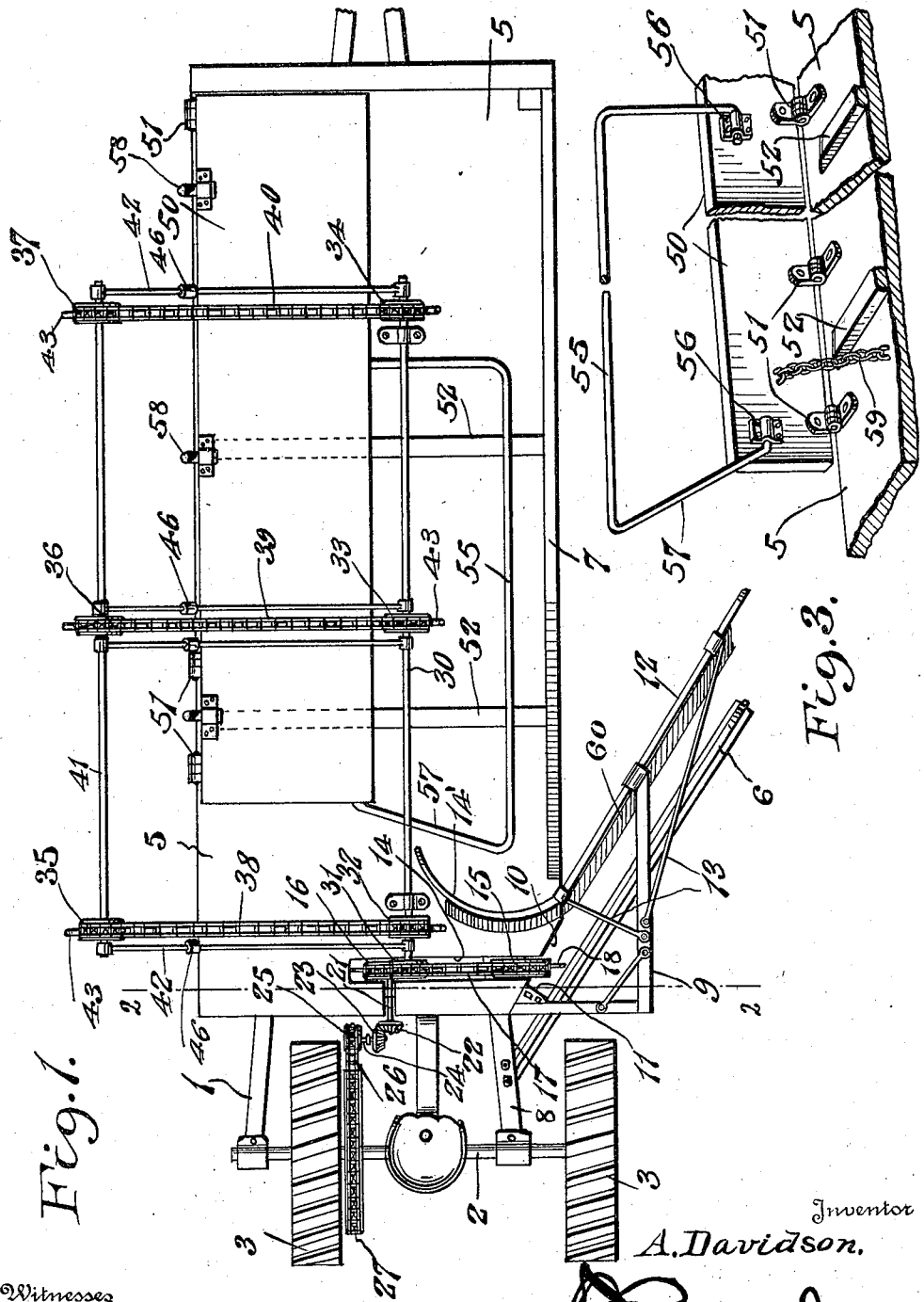

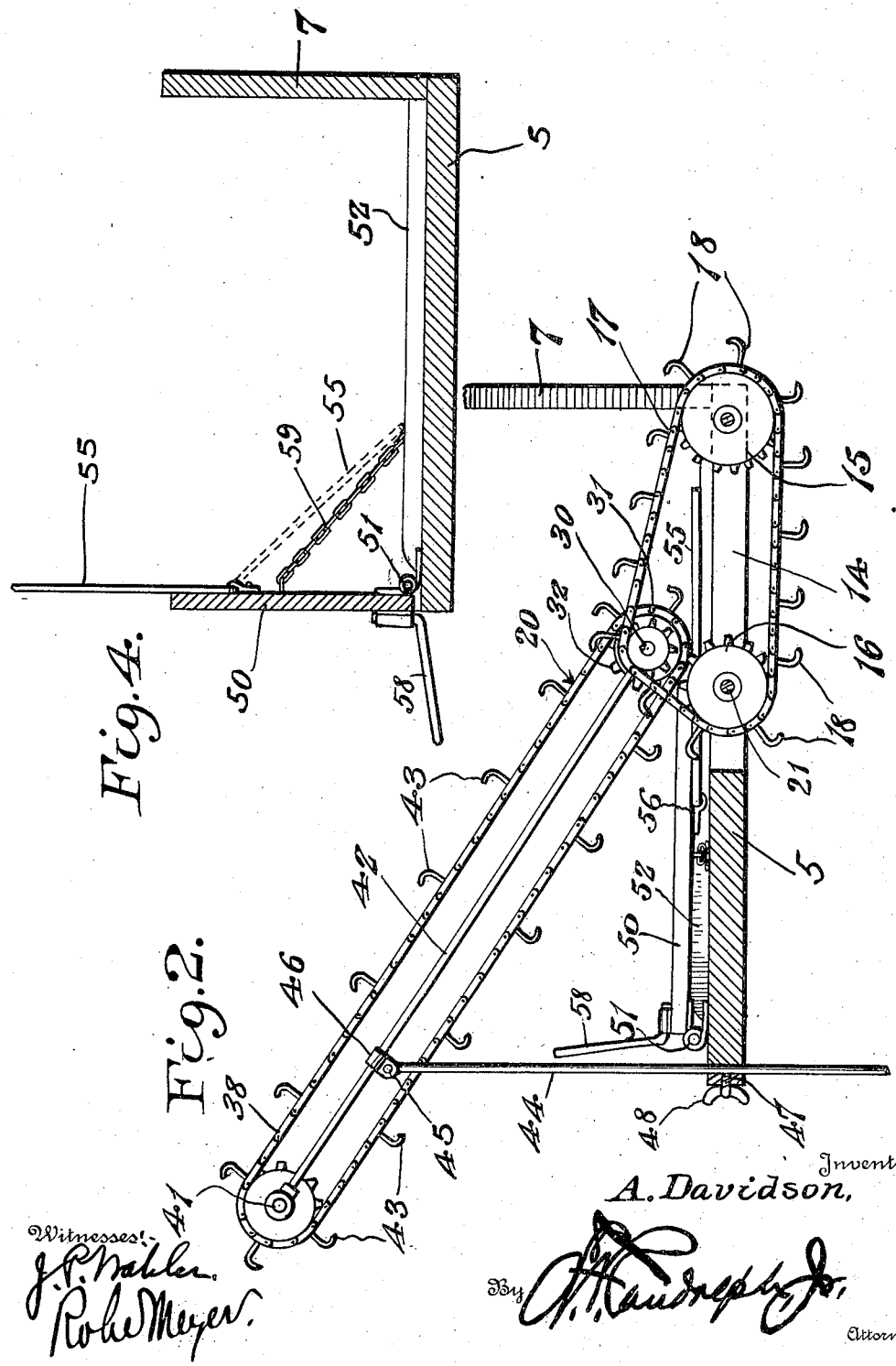

UNITED STATES PATENT OFFICE.

ALFRED DAVIDSON, OF NEW FLORENCE, MISSOURI.

CORN-HARVESTER.

1,179,290.   Specification of Letters Patent.   Patented Apr. 11, 1916.

Application filed November 20, 1914. Serial No. 873,180.

*To all whom it may concern:*

Be it known that I, ALFRED DAVIDSON, a citizen of the United States, residing at New Florence, in the county of Montgomery and State of Missouri, have invented certain new and useful Improvements in Corn-Harvesters; and I do hereby declare the following to be a full, clear, and exact description of the invention, such as will enable others skilled in the art to which it appertains to make and use the same.

This invention relates to corn harvesters, and the primary object of the invention is to improve the construction of corn harvesters set forth in Letters Patent No. 1,115,288 patented Oct. 27, 1914.

Another object of this invention is to attach to the forementioned corn harvester a novel form of dumping device, which is provided for dumping the corn which is cut from the supporting platform of the harvester into bundles at various intervals during the cutting of the corn.

Another object of this invention is to detachably attach to the corn harvester a loading mechanism which embodies a plurality of conveyers operable by the traction of the corn harvester proper for elevating the cut corn and depositing it in a wagon or other suitable receptacle which is positioned alongside of the corn harvester.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved corn harvester. Fig. 2 is a sectional view on the line 2—2 of Fig. 1. Fig. 3 is a detail perspective view of the dumping mechanism which is attached to the corn harvester, and Fig. 4 is a cross sectional view through the corn supporting platform showing the dumping mechanism in a dumped or operated position.

Referring more particularly to the drawing, 1 designates the supporting frame of the corn harvester which has supported at the rear end thereof an axle 2 upon which are mounted traction wheels 3. The supporting frame 1 has a platform 5 mounted thereupon and positioned forwardly of the axle 2 and the traction wheels 3.

The corn harvester platform 5 has supported adjacent the rear end thereof and outwardly of one side edge the cutting mechanism for cutting the corn. The cutting mechanism embodies a cutter blade 6 which is disposed obliquely to the line of travel of the corn harvester and extends beyond the edge of the platform 5 being positioned rearwardly from the side board 7 of the platform. The cutting blade 6 is securely attached to one rail 8 of the supporting structure and is supported by an angled supporting brace 9 which extends transversely from the platform 5. The rear end of the side of the platform adjacent the cutting blade 6 is cut away as is shown at 10, so that the edge thereof will extend parallel with the edge of the cutting knife or blade 6. An auxiliary or second cutting blade 11 is secured to the platform 5 in any suitable manner and is disposed at right angles to the cutting blade 6 and is provided for cutting stalks of corn which have not been completely severed by the blade 6. The cutting blade 6 has a guiding arm 12 positioned upwardly therefrom which guiding arm is supported by suitable rods 13 which are connected to the angled bracing bracket 9. The construction of the guiding arm 12 and the manner of mounting the same are similar to the construction disclosed in the Letters Patent No. 1,115,288. The lower end of the arm 12 is turned downward for picking up down or fallen stalks of corn, and an ear guiding member 60 is secured to the rear side of the arm for preventing the ears of corn from hanging down back of the arm. The arm is curved as is shown at 14' for extending across the platform 5 for properly guiding the cut stalks of corn for insuring their falling upon the upper surface of the platform.

The platform 5 is provided with a slot 14 formed therein through which slot protrudes a pair of sprockets 15 and 16 about which a chain 17 travels. The sprocket chain 17 has a plurality of hooks 18 secured thereto at spaced intervals, which hooks are provided for receiving the cut stalks of corn from the cutting blades 6 and 11 and carrying them over for depositing them upon the platform 5 or upon the loading conveyers 20, which will be hereinafter more fully described. The sprocket 16 is mounted upon a shaft 21, which is supported above the platform 5 and has a bevel gear 22 mounted upon one end thereof, which meshes with a second bevel gear 23 that is mounted upon a stub shaft 24. The stub shaft 24 has a sprocket 25 mounted upon the end opposite to the end upon which the bevel gear 23 is mounted. A sprocket chain 26 passes about the sprocket 25 and also about a sprocket 27, which is mounted upon the rear axle 2 of the corn harvester, by means of which sprockets and bevel gears the chain 17 is operated or moved by the traction of the corn harvester.

The platform 5 has a shaft 30 journaled transversely therealong, which shaft has a sprocket 31 mounted upon its rear end. The sprocket 31 is positioned so that the chain 17 which carries the hooks 18 will travel thereover, as is clearly shown in Fig. 2 of the drawings, and rotate the shaft 30 by the rotation of the rear axle 2 in the manner heretofore described. The shaft 30 has sprockets 32, 33 and 34 positioned thereon at spaced intervals along its length. The sprockets 32, 33 and 34 are connected to sprockets 35, 36 and 37 respectively, by sprocket chains 38, 39 and 40. The sprockets 35, 36 and 37 are mounted upon a shaft 41, which is connected to the shaft 30 by bracing rods 42. The shaft 41 is disposed above and to one side of the shaft 30 and also above and to one side of the platform 5, so that the corn stalks which are received by the hooks 43 which are carried by the various sprocket chains 38, 39 and 40, will be deposited in a wagon (not shown) or other suitable receptacle which may be driven alongside of the corn harvester.

The rods 42 are further braced by vertical bracing bars 44, which are pivotally connected as is shown at 45 to straps 46, which straps are mounted upon the bars or rods 42. The vertical rods 44 are slidably carried by brackets 47, which are secured to the side edges of the platform 5, and they are held in various adjusted positions by thumb screws 48 so as to regulate the height of the shaft 41 above the platform 5 and also regulate the degree of incline of the conveyer chains 38, 39 and 40.

The platform 5 has a side board 50 hingedly connected thereto by means of hinges 51. The hinges 51 are secured to the inner sides of the side board 50 and the upper surface of the platform 5, so that the side board may be folded inwardly and rest in a plane parallel with the surface of the platform.

The platform 5 has strips 52 mounted upon its upper surface against which the hinged side 50 rests, when in a folded position. The strips 52 extend completely across the upper surface of the platform as is clearly shown in Fig. 4 of the drawings.

The hinged side board 50 has an arm 55 hingedly connected thereto as at 56. The arm 55 is formed of a continuous rod and bent to assume substantially a U-shape having its vertex positioned outwardly from the upper edge of the side board 50. The forward end 57 of the U-shaped arm 55 extends at an angle with respect to the other side of the member and toward the chain 17 and the cutting mechanism. The strips 52 hold the arm 55 out of engagement with the upper surface of the platform 5 so that it may be easily gripped by a person's hand for raising the platform for dumping a load of corn therefrom.

The hinged side board 50 has angled fingers 58 secured to the under surface thereof and extending upwardly along its hinged edge which fingers are provided for preventing the corn stalks from sliding off the side 50 when it is lying upon the strip 52. A chain or other flexible member 59 is secured to the side 50 and to the platform 5 and is provided for relieving the fingers 58 from the strain of supporting the side board when the latter is in a vertical position.

During the corn cutting operation the side board 50 is positioned for lying flat upon the strips 52 and parallel with the upper surface of the platform, so that the stalks of corn as they are cut by the cutting blade and guided forwardly by the arm 12 will be deposited upon the side board and the arm 55. When a desired number of stalks have been deposited upon the arm 55 and the side board 50, these parts are raised by the operator of the corn harvester gripping the arm 55 and raising it upwardly, which dumps the stalks of corn upon the ground alongside of the corn harvester.

After the side board 50 and the arm 55 have been moved into a vertical position for dumping the stalks of corn therefrom the arm 55 is folded downwardly as is shown in dotted lines in Fig. 4 of the drawings, after which the side board 50 is folded downwardly, which slides the arm 55 across the bars or strips 52 and gathers up the stalks which have been deposited upon the platform during the dumping of the load of stalks from the side board and arm.

When it is desired to utilize the dumping mechanism embodying the hinged side 50 and the arm 55, the shafts 30 and 41, the chains carried thereby and the rigid bracing rods 42 are removed from connection with the platform so as to permit of the free and unimpeded movement of the hinged side 50 and the arm 55.

When it is desired to use the chains 38, 39 and 40 for elevating the corn and depositing it in a wagon (not shown) or like structure, the hinged side 50 and the arm 55 need not be removed, owing to the fact that when they are in a folded position or lying upon the upper surface of the platform 5 they will be out of the way of the operation of the chains, as is clearly shown in Fig. 2 of the drawings.

From the foregoing description taken in connection with the accompanying drawings the advantages of construction and of the method of operation of the improved corn harvester will be readily apparent to those skilled in the art to which this invention appertains and, while in the foregoing description, the principle of the operation of this invention has been described together with various features of construction. it is to be understood that certain minor features of construction, combination and arrangement of parts may be altered to suit practical conditions provided such alterations are comprehended within the scope of what is claimed.

What is claimed is:—

1. In a corn harvester, a platform, a cutting blade carried by said platform and extending outwardly therefrom obliquely to the line of travel of said harvester, a side board hingedly connected to said platform for folding upon the upper surface thereof, a substantially U-shaped arm hingedly connected to said side board and extending outwardly from the upper end thereof, said side board and said arm adapted for receiving corn stalks from said cutting blade.

2. In a corn harvester, a platform, a cutting blade secured to said platform and extending outwardly therefrom obliquely to the line of travel of the harvester, a side board hingedly connected to the upper surface of said platform and disposed along one side edge thereof, a substantially U-shaped arm having the terminals of its leg hingedly connected to said side board, said side board and said arm adapted for lying in a parallel plane with said platform and upon the upper surface thereof, said platform being provided with a transversely extending slot, a chain movable in said slot, a plurality of hooks carried by said chain for receiving the corn stalks from said cutting blade and depositing them upon said hinged side board and said arm, said arm and said side board adapted for vertical movement for dumping the corn therefrom.

3. In a corn harvester, a platform, a cutting blade secured to said platform and extending outwardly therefrom obliquely to the line of travel of the harvester, a side board hingedly connected to the upper surface of said platform and disposed along one side edge thereof, a substantially U-shaped arm having the terminals of its legs hingedly connected to said side board, said side board and said arm adapted for lying in a parallel plane with said platform and upon the upper surface thereof, said platform being provided with a transversely extending slot, a chain movable in said slot, a plurality of hooks carried by said chain for receiving the corn stalks from said cutting blade and depositing them upon said hinged side board and said arm, said arm and said side board adapted for vertical movement for dumping the corn therefrom, a plurality of strips carried by the upper surface of said platform for holding said hinged side board and said arm in spaced relation to said platform.

4. In a corn harvester, a platform, a cutting blade secured to said platform and extending outwardly therefrom obliquely to the line of travel of the harvester, a side board hingedly connected to the upper surface of said platform and disposed along one side edge thereof, a substantially U-shaped arm having the terminals of its legs hingedly connected to said side board, said side board and said arm adapted for lying in a parallel plane with said platform and upon the upper surface thereof, said platform being provided with a transversely extending slot, a chain movable in said slot, a plurality of hooks carried by said chain for receiving the corn stalks from said cutting blade and depositing them upon said hinged side board and said arm, said arm and said side board adapted for vertical movement for dumping the corn therefrom, a plurality of strips carried by the upper surface of said platform for holding said hinged side board and said arm in spaced relation to said platform and a plurality of vertical fingers carried by said platform and extending upwardly from the edge thereof to which said side board is hingedly connected.

In testimony whereof I affix my signature in presence of two witnesses.

ALFRED DAVIDSON.

Witnesses:
 ROBERT BADGER,
 MILTON LANDRUM.

Copies of this patent may be obtained for five cents each, by addressing the "Commissioner of Patents, Washington, D. C."